(12) United States Patent
Clark

(10) Patent No.: US 7,708,818 B2
(45) Date of Patent: May 4, 2010

(54) AIR FILTERING ASSEMBLY FOR USE WITH OXYGEN CONCENTRATING EQUIPMENT

(75) Inventor: Steven G. Clark, O'Fallon, MO (US)

(73) Assignee: Fenix Medical, LLC., St. Louis, MO (US)

( * ) Notice: Subject to any disclaimer, the term of this patent is extended or adjusted under 35 U.S.C. 154(b) by 674 days.

(21) Appl. No.: 11/546,585

(22) Filed: Oct. 11, 2006

(65) Prior Publication Data
US 2008/0087169 A1 Apr. 17, 2008

(51) Int. Cl.
B01D 46/00 (2006.01)
(52) U.S. Cl. .............................. 96/385; 96/380; 96/384; 128/200.24
(58) Field of Classification Search ................... 96/385, 96/380, 384; 128/200.24
See application file for complete search history.

(56) References Cited

U.S. PATENT DOCUMENTS

| | | | | |
|---|---|---|---|---|
| 1,783,276 A * | 12/1930 | Bliss | ........................... | 454/206 |
| 4,072,210 A | 2/1978 | Chien | | |
| 4,277,443 A | 7/1981 | Van der Smissen et al. | | |
| 4,342,573 A * | 8/1982 | McCombs et al. | ............ | 96/109 |
| 4,411,264 A * | 10/1983 | Jacobson | ............... | 128/201.23 |
| 4,450,933 A | 5/1984 | Fukuoka et al. | | |
| 4,637,877 A | 1/1987 | Hartmann et al. | | |
| 4,693,339 A | 9/1987 | Beale et al. | | |
| 4,881,313 A | 11/1989 | Artinyan et al. | | |
| 4,998,891 A | 3/1991 | Bresko | | |
| 5,037,460 A | 8/1991 | Machado | | |
| 5,137,433 A * | 8/1992 | Willinger et al. | ............ | 417/312 |
| 5,549,720 A | 8/1996 | Miller et al. | | |
| 5,746,806 A | 5/1998 | Aylsworth et al. | | |
| 5,996,731 A | 12/1999 | Czabala et al. | | |
| 6,126,410 A | 10/2000 | Kung et al. | | |
| 6,126,721 A | 10/2000 | Nemser et al. | | |
| 6,217,281 B1 * | 4/2001 | Jeng et al. | ................... | 415/119 |
| 6,382,931 B1 | 5/2002 | Caabala et al. | | |
| 6,702,880 B2 | 3/2004 | Roberts et al. | | |
| 6,866,700 B2 | 3/2005 | Amann | | |
| 6,935,400 B1 | 8/2005 | Welsh | | |
| 7,141,101 B2 * | 11/2006 | Amann | ........................ | 96/380 |
| 2002/0027041 A1 * | 3/2002 | Czabala et al. | .............. | 181/229 |
| 2005/0072298 A1 * | 4/2005 | Deane et al. | ................... | 95/96 |

* cited by examiner

*Primary Examiner*—Duane Smith
*Assistant Examiner*—Christopher P Jones
(74) *Attorney, Agent, or Firm*—Paul M Denk (57) ABSTRACT

An air filtering assembly for use with oxygen concentrating equipment, the assembly including a filter containment housing, a cover therefore, and a filter support and divider provided therein. A filter rests upon the divider, and below the divider are a series of baffles, that provide a circuitous path for the filtered air to flow, to effect sound dampening, during usage of this filter assembly in combination with the concentrator of an oxygen concentrating apparatus.

4 Claims, 7 Drawing Sheets

FIG. 11  FIG. 12  FIG. 13  FIG. 14

AIR FILTERING ASSEMBLY FOR USE WITH OXYGEN CONCENTRATING EQUIPMENT

FIELD OF THE INVENTION

This invention relates primarily to air filtering means, and more specifically to a more universal type of air filtering device that incorporates noise silencing features and for use in combination with oxygen concentrating equipment, for aiding in the generation of highly efficient and pure oxygen from air.

BACKGROUND OF THE INVENTION

This invention relates to air filtering equipment. Heretofore, many types of filters have been readily available for use upon an oxygen concentrator, but the particular filters involved normally are designed specifically for application to their own item of equipment, and therefore, can not be transferred for usage with other or related concentrators, by the hospital, medical technician, or even the patient.

As is known in the art, oxygen concentration has been available for use in the medical field for years. Generally, patients who suffer from respiratory problems, and particularly those with emphysema, regardless of the source or generation of the illness, frequently become so breathing impaired that they need to be hooked up to oxygen, for extended portions of the day or night, in order to effectively breathe air, and oxygen, and in some instances, to sustain life. These types of concentrators normally generate purified oxygen from air, and in many instances, they can achieve such in the range of ninety to ninety-five percent (90% to 95%) conversion of pure oxygen, from air, during usage. This type of equipment is well known and readily available in the art.

In addition, many other type of filtering structures have been developed for use in oxygen concentrators. The filters are primarily designed for use for filtering out any particulate matter that may be included in the air that is drawn into the concentrator, and secondarily, may have a tendency to dampen some of the noise generated by the concentrator, and particularly its compressor, during the separation of oxygen from the incoming air.

An example of the foregoing type of filter can be seen in the United States patent to Roberts, et al, U.S. Pat. No. 6,702,880, which identifies and shows an inlet silencer/filter for an oxygen concentrator. While this device may be effective for filtering the air, and attempting to reduce the noise of the concentrator, it is a filtering device that is apparently built for a specific concentrator, and does not have universal application. Secondly, it uses a specific type of felt pad(s), to serve primarily as the sound dampening material, in order to minimize noise emissions from the oxygen concentrator.

Other examples of filter structures, and as even used in concentrators or compressors, can be seen in a variety of earlier patents. For example, U.S. Pat. No. 4,072,210 shows a compressor, with filter structure provided within the air flow lines. U.S. Pat. No. 4,277,443, shows an air purifying cartridge for respirators, and which incorporates various types of filtration medium that are embodied within the structure of the cartridge. The U.S. Pat. No. 4,450,933, shows a type of a suction silencer, that may be used in combination with a compressor, or the like. U.S. Pat. No. 4,637,877, shows a filter disc, for use for filtration purposes. The U.S. Pat. No. 4,693,339, shows a muffler for gas inducing machinery generating low frequency noise. U.S. Pat. No. 4,881,313 discloses a method for forming a cell filter with an exposed surface. U.S. Pat. No. 5,037,460 shows a disposable type of air filter. The U.S. Pat. No. 5,549,720, discloses another filter for use with an air compressor, for a concentrator. U.S. Pat. No. 5,996,731, discloses a compressor muffler. The U.S. Pat. No. 6,126,721, shows an oxygen enriched air supply apparatus. U.S. Pat. No. 6,126,410, shows a head cover assembly for a reciprocating compressor. The U.S. Pat. No. 6,382,931, shows a compressor muffler, related to what is disclosed in the previous U.S. Pat. No. 5,996,731. The U.S. Pat. No. 6,866,700, shows a filter housing assembly for use in oxygen concentrators and other compressors.

These are examples of the types of air filters for use with compressors that are in the art, most of them are custom made for their own specific applications with particular air compressors or concentrators, and do not have universal usage, as the design for the current invention.

SUMMARY OF THE INVENTION

This invention relates primarily to air filtration, but more specifically relates to a universal type of filter that not only can eliminate particulate matter from air being taken into an oxygen concentrator, but at the same time, substantially reduce the noise associated with the operations of its compressor, during usage. As can be readily understood, when a patient requiring oxygen has an air compressor sitting next to his/her for hours on time, with the loud noise of the compressor, and the sucking noise of the air intake, are associated with the functioning of the concentrator, such noise can be deafening over a period of time. Hence, the current invention is designed to not only filter the air incoming to the concentrator, but substantially reduces the noise and sound associated with the operations of the concentrator, and its compressor, to the point where such noises are substantially reduced, if not eliminated, and the only sound emanating from the operations of the device is the sucking noise of the air being intaken into and through the filter, for delivery to the concentrator. This substantially lessens the annoyance, irritation, and the deafening effects to the patient, while using the filter of this current invention.

Secondly, the filter is designed to have universal application, so that it can be retrofitted into almost all of the concentrators that are currently on the market, thereby making it more universal of application, and can be bought as a shelf product, for application and usage upon any of these types of medical equipment.

This invention contemplates the formation of a molded casement, having generally rectangular configuration, including a housing part, and a lid, which when fully assembled together, incorporates a front integral fitting to which an air connection may be readily applied, designed to accept and accommodate almost any air connection from all of the variety of concentrators that are currently available and marketed. Internally of the encasement is a volumetric capacity for holding a HEPA filter therein, of the type that is normally used and employed for effectively filtering the incoming air to the concentrator, and removes any particulate matter or dust that may be entrained within the air flow. Frequently these types of devices may also be used by the patient when walking outdoors, and therefore the dust and other impurities that may be entrained in the air, when drawn into the compressor, are desired to be removed therefrom, so that they do not contaminate the siphoning beds contained within the compressor, and thereby reduce the efficiency of its generation of purer oxygen, during operation.

A filter support is applied into the containment housing, for this air filter, and it is designed to support the filter therein, and any noise suppression pad that may be used in conjunction therewith. But, in the preferred embodiment, because of the unique structure of this invention, and its ability to dampen the noises generated by the concentrator, frequently, the noise suppression pad will not be required.

The support includes integrally a series of upstanding ribs, that provide a flow path for the air passing through the HEPA filter, so that it can pass down at one end into a baffling arrangement as at one end of the separator, with the purified air passing along a series of baffles that requires the air to turn, at least approximately nine times, as it traverses the bottom of the containment housing and enters into an air chamber for passage through the air connection that leads towards the compressor, within the concentrator, for further processing into purified oxygen. Applicant has found that by bending the flow path of the air, and making it turn three hundred sixty degrees (360°) repeatedly, has a very dampening effect upon the volume of the sound generated from the concentrator, and therefore, substantially eliminates and reduces the amount of compressor noise, emanating from the device, during usage of the filter of this invention. This is what is also embodied into the second attribute of this invention, the ability to substantially reduce the sound generated from the concentrator during usage, while at the same time, providing a more universal type of filter that can be applied and used with most concentrators, currently available upon the market. Hence, the benefits derived from this invention are two fold.

The lid of the containment housing of this invention is also reinforced, so as to be able to structurally withstand any vacuuming forces that may be exerted upon the housing, during its usage, due to the suction generated by the compressor, when drawing air into the filter, for eventual delivery to the concentrator, for processing. The cover incorporates a small aperture, along its surface, that provides for the intake of air into the filter housing, where it is exposed to the entire upper surface of the HEPA filter therein, to provide for that separation of any particulate matter, that may be entrained within the air as it is drawn into the concentrator of this invention.

It is, therefore, the principal object of this invention to provide an air filter for a concentrator which is of uniform construction, that is adaptable for being fitted into most concentrators for use for filtering air taken into such a device.

Another object of this invention is to provide a containment housing for an air filter that can use a much larger type of HEPA filter, therein, to increase the efficiency of filtration of the embodiment.

A further object of this invention is to provide an air filter for a concentrator that may also include a HEPA filter, and noise suppression pad, for use for achieving air purification and noise reduction.

Still another object of this invention is to provide a containment housing for an air filter that incorporates a series of baffles, which redirects the passing filtered air through a plurality of baffles, and which has the effect of efficiently dampening the noise generated by the concentrator during its operations.

Still another object of this invention is to provide a uniform and universal type of filter, that can be easily installed within the variety of concentrators readily available upon the market.

Yet another object of this invention is to provide an air filter housing that is reinforced, in order to withstand any of the vacuum forces generated upon it while filtering air passing therethrough and to the oxygen concentrator.

These and other objects may become more apparent to those skilled in the art upon review of the summary of the invention as provided herein, and upon undertaking a study of the description of its preferred embodiment, in view of the drawings.

DESCRIPTION OF THE PREFERRED EMBODIMENT

Essentially, this invention for an air filtering assembly for use with oxygen concentrating equipment is a polymer or other materials molded housing, comprising of three parts, namely, the containment housing, a lid therefore, and a filter support and divider between the filtration portion of the housing, and the circuitous path for the filtered air as it is advanced by the compressor towards the concentrator.

Figure 1:
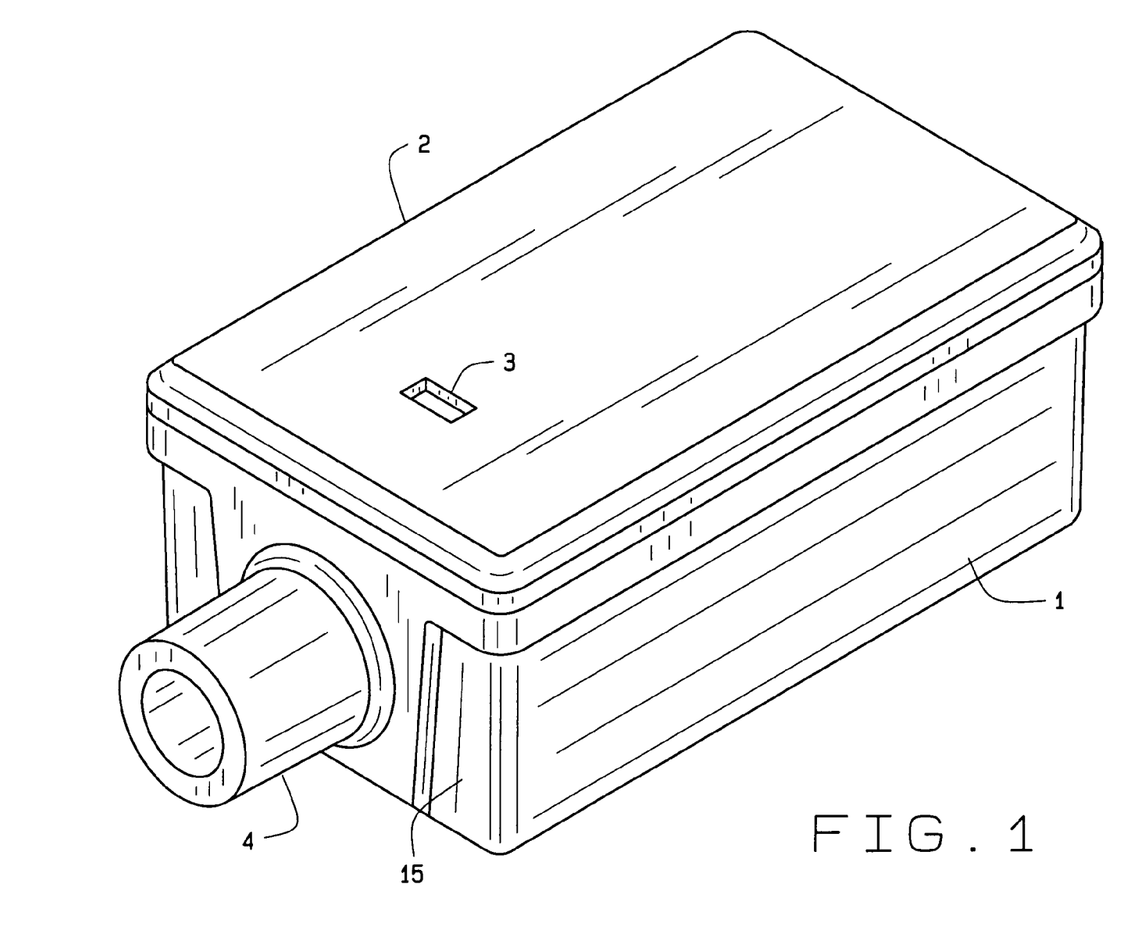
FIG. 1 is an isometric view of the air filtering assembly for use with oxygen concentrating equipment of this invention.

In referring to FIG. 1, the containment housing 1 is shown, having a lid 2 applied thereon, a lid which snuggly fits within the housing, and rests on top thereof, and further includes a small aperture, as at 3, and into which the air is drawn for filtration. Once the air has been filtered, and transverses the baffling path provided in the lower portion of the housing, it exits an outlet 4, to which the connection from the concentrator may be threadedly or otherwise engaged thereto, for passing the filtered air to the concentrator for further processing.

Figure 2:
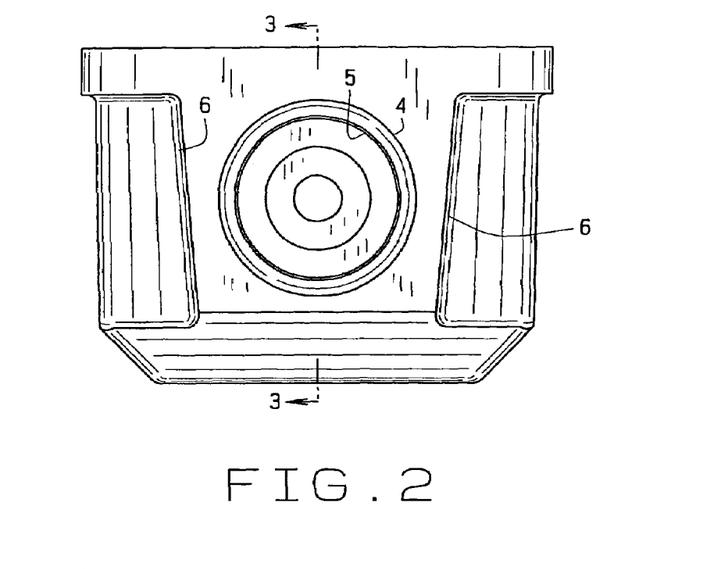
FIG. 2 is a front view thereof.

FIG. 2 provides a front view of the housing, showing the fitting 4 which normally has an interior opening, as at 5, which may contain threads therein, for use for threadedly engaging a hose fitting therein, during installation. The housing has sufficient reinforcement built into it, as molded, as can be noted at 6, so as to withstand the vacuuming force of the compressor, as it draws air from the air filtering assembly.

Figure 3:
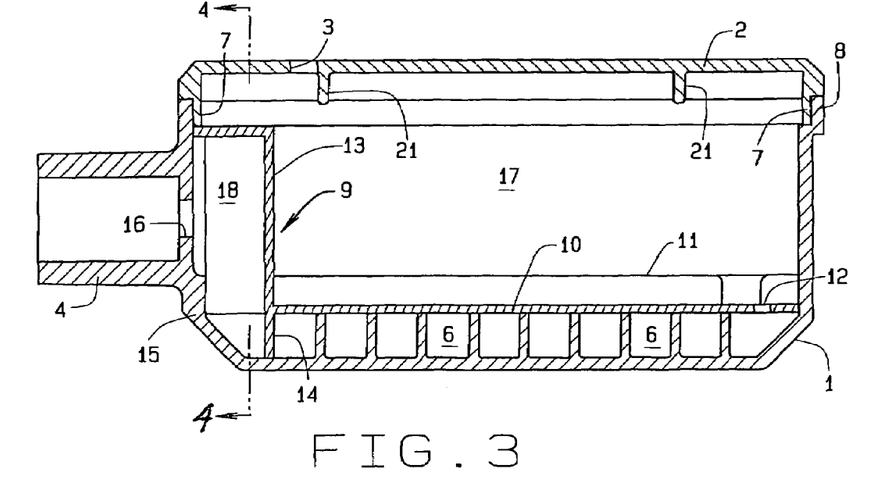
FIG. 3 is a sectional view taken along the line 3-3 of FIG. 2.

The three components that make up the air filtering assembly of this invention can be seen in FIG. 3. It includes the housing 1, its lid 2, and it can be seen how the lid has a lip, as at 7, which can tightly insert within the upper edge of the housing, as at 8, to provide for securement of the two components together. In addition, the inlet opening 3, through the cover, can also be seen therein. In addition, the filter support and dividing member 9, as previously reviewed, can also be seen. This support includes a base like plate 10, having a series of upwardly extending longitudinal ribs 11, provided thereon, so that any air passing through the filter (not shown) will traverse rearwardly, and pass through the openings as at 12, for entrance into the bottom air baffling and circuitous path that leads towards the front of the housing, as the air is drawn therefrom through the fitting 4. A front wall for the filter support, as at 13, extends both upwardly and downwardly, as shown at 14, and forwardly thereof, between it and the front wall of the housing 15, there is a plenum where the air, after filtering, and after passing through the series of baffles, enters into the opening 16, and through the fitting 4, for passing into any connection therewith, leading towards the oxygen concentrator to which it is operatively associated. This filter support and divider 9 is removable, but is easily fitted therein, as during usage. The space between the cover 2, and the upper edges of the longitudinal ribs 11, generally as noted at 17, is the area in which the HEPA filter locates, and a filter of significant size, of this type, generally is in the vicinity of one inch (1") thick, two and a quarter inches (2¼") wide, and approximately three and one half inches (3½") long, for fitting snuggly and compactly within the volumetric space formed by the area 17, in order to filter all of the air that enters through the intake port 3, for filtration. Or, in the alternative, a filter of lesser height may be used, and a thin felt pad may be provided and rested upon the upper edges of the longitudinal ribs 11, to further aid in the dampening of any noises generated during usage of the concentrator, to the benefit of the patient.

Figure 4:
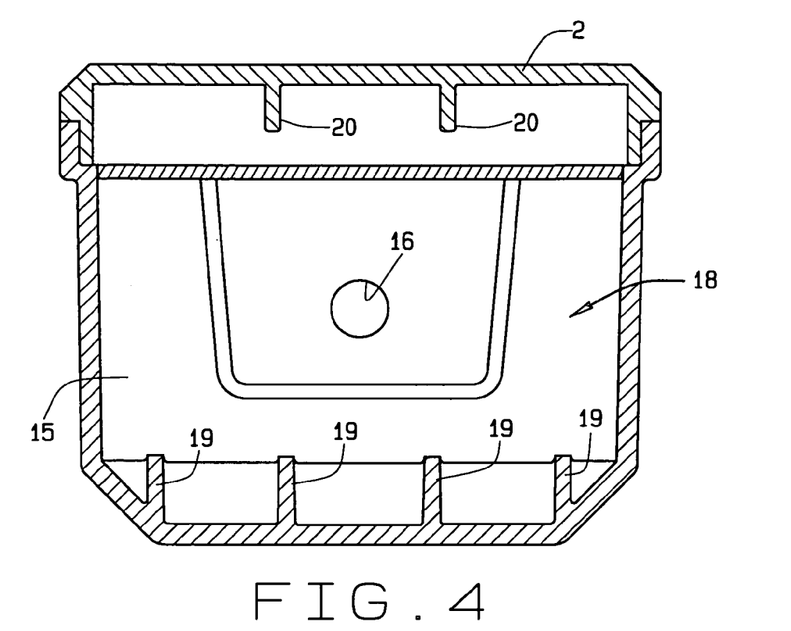
FIG. 4 is a transverse sectional view taken along the line 4-4 of FIG. 3.

FIG. 4 shows an internal view of the front wall 15 of the containment housing, how it forms the air space 18 therein, for directing the air out of its outlet 16, and towards the air supply connection with the concentrator. The lower end of the front of the housing, as at the lower portion of the air plenum 18, may contain some reinforcement, as at 19, to add further structural support for the device. The cover 2 is also shown having a series of longitudinal reinforcing ribs 20, that act in cooperation with the transverse reinforcement ribs 21 to add structural support to the cover, during usage.

Figure 5:
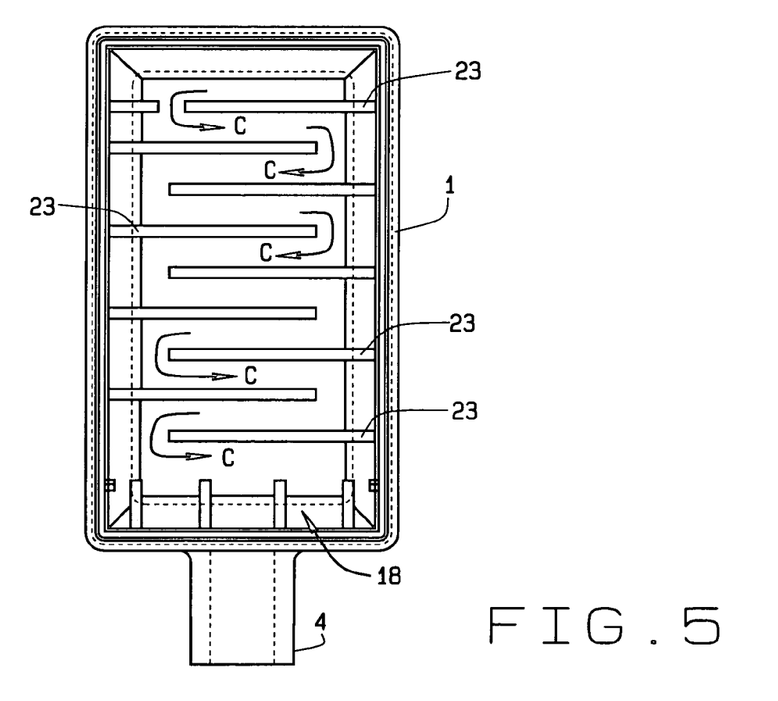
FIG. 5 is a top view of the filter, with the cover and filter support removed, showing the air flow baffling provided in the bottom of the housing.
Figure 6:
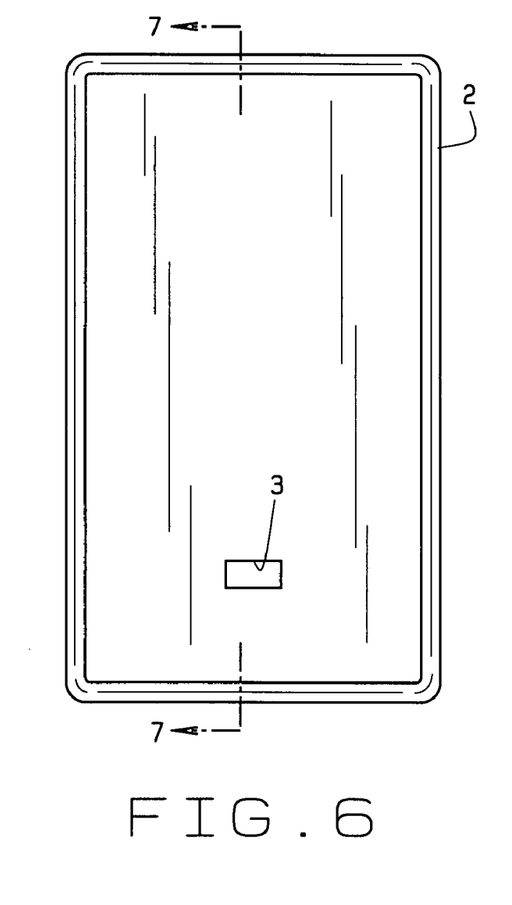
FIG. 6 is a top view of the cover.
Figure 7:
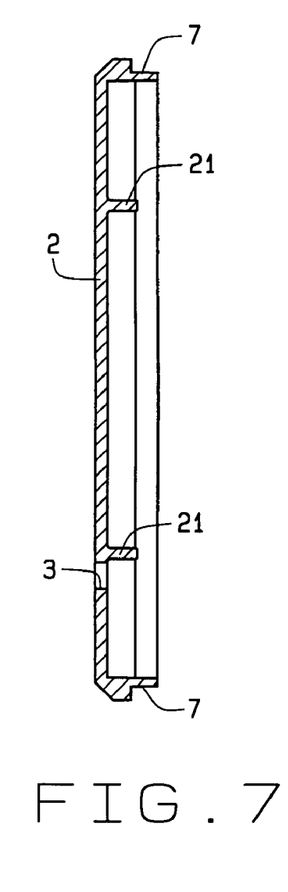
FIG. 7 is a longitudinal sectional view of the cover, taken along the line 7-7 of FIG. 6.
Figure 8:
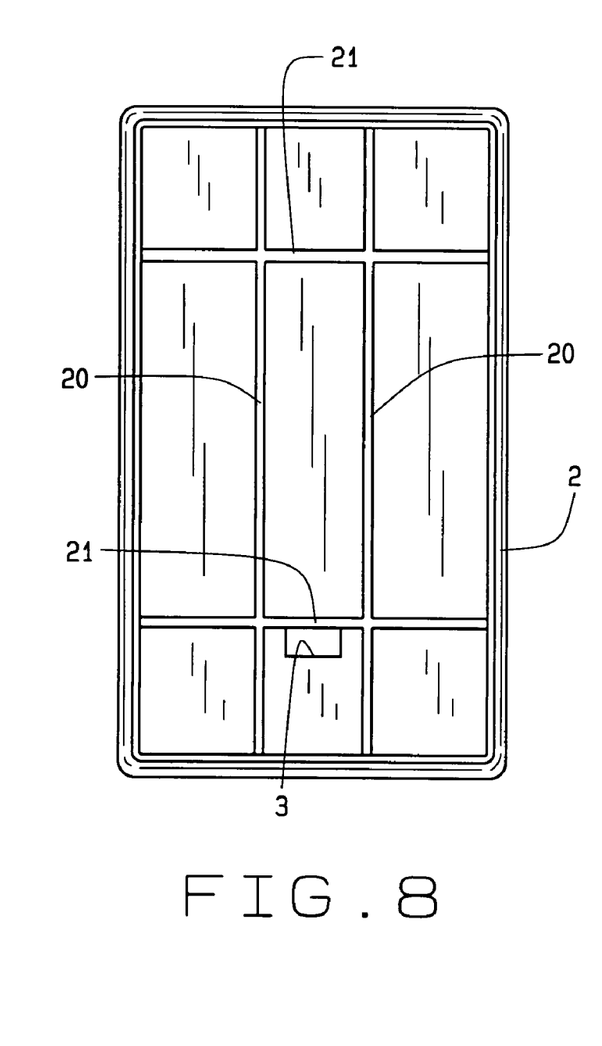
FIG. 8 is an interior view of the cover.

FIG. 5 shows the bottom of the containment housing 1, with the filter support and divider removed, and discloses a series of integral baffles, formed of the bottom of the housing, that provides a circuitous path, generally as shown at C, as its traverses around the various bends, of the baffles, in flowing from the back of the housing, after it passes through the orifice 12, towards the front plenum 18, for direction up towards and absorption through the outlet port 16, for passage, as filtered air, to the concentrator.

FIGS. 6-9 show various views of the cover, as previously explained herein, its various reinforcement ribs, to sustain the structure of the air filtering cover, during usage.

Figure 9:
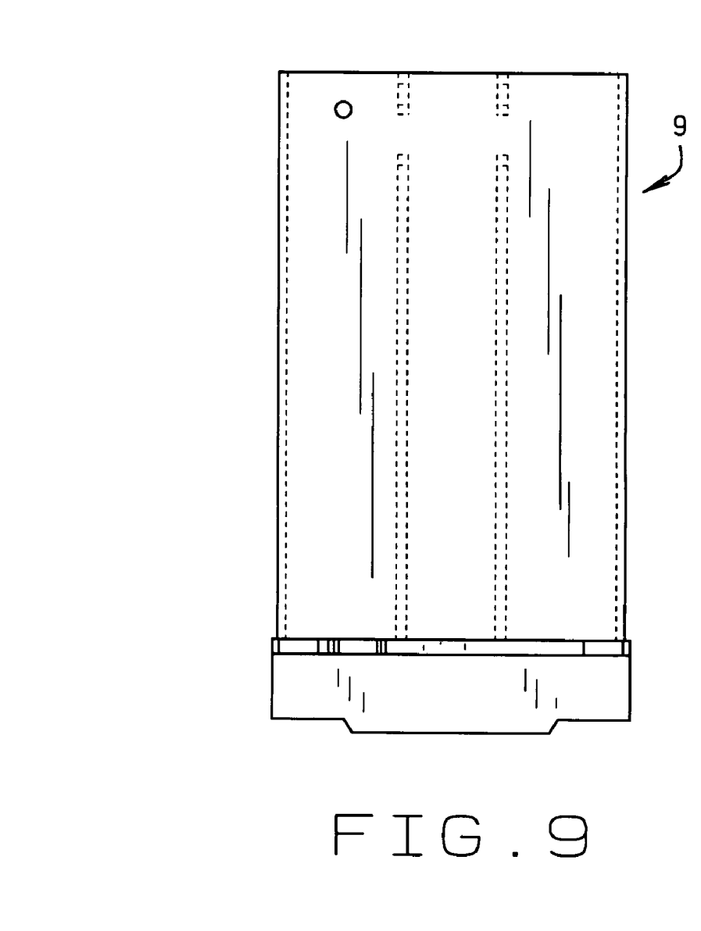
FIG. 9 is a top view of the filter support and divider.
Figure 10:
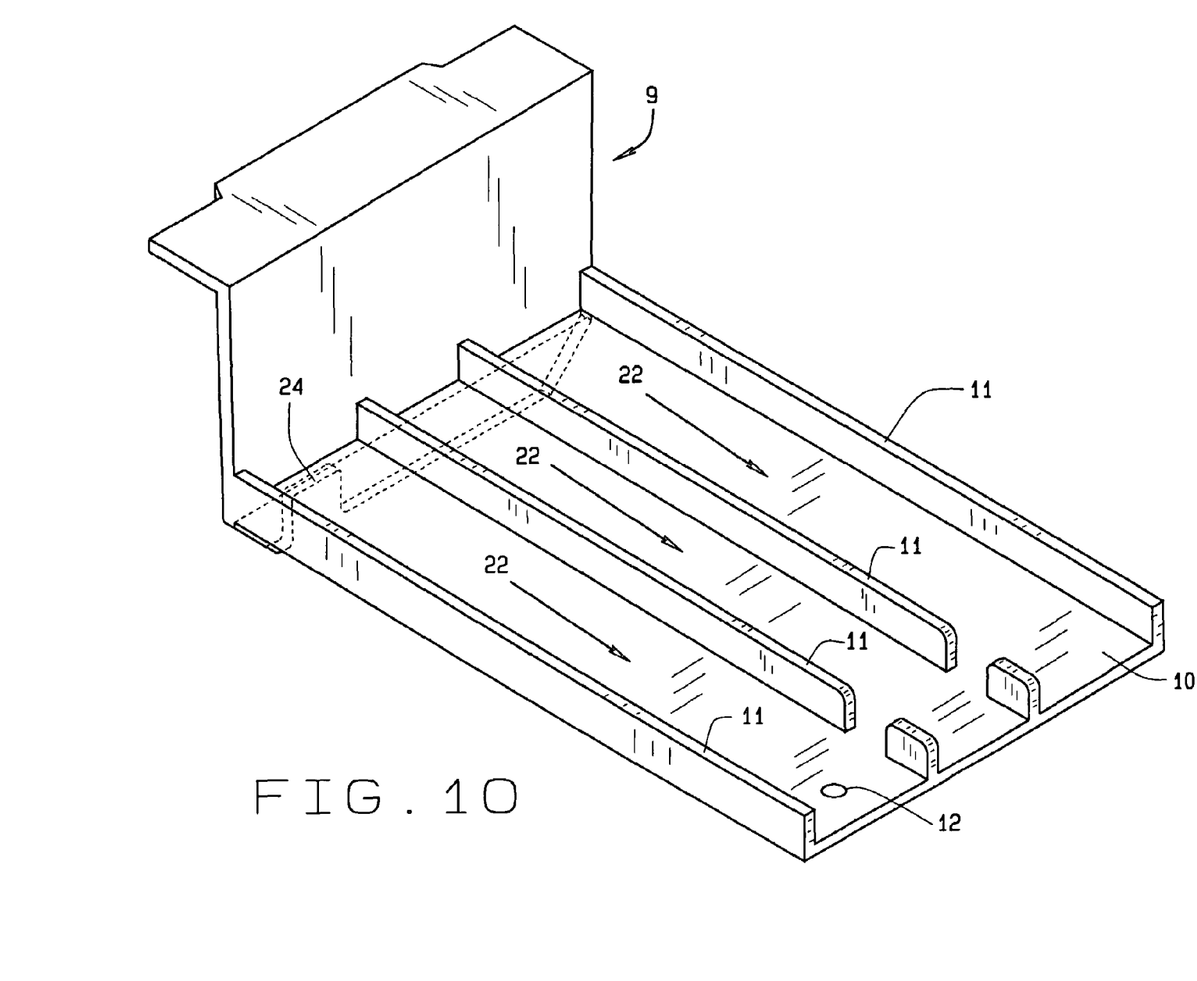
FIG. 10 is an isometric view of the filter support and divider.
Figure 11:
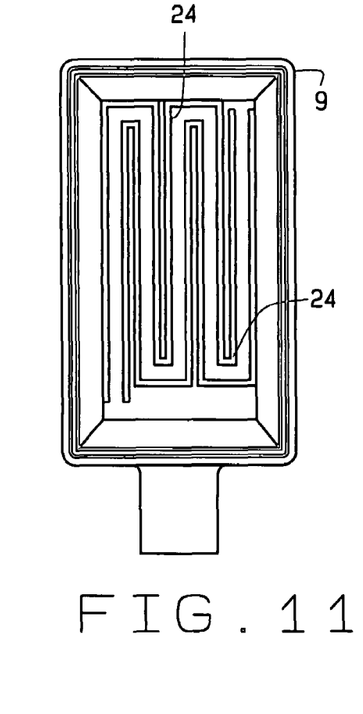
FIG. 11 is a top view of the containment housing for the air filter disclosing a differing baffle arrangement from that as shown in FIG. 5.

The air filter support and divider, as previously noted at 9, is also shown in FIG. 9. FIG. 10 shows this support in its isometric view, and includes the base 10, having the longitudinal ribs 11 provided thereon, and upon which the filter rests, along its bottom surface. Thus, the space between the various ribs, as generally noted at 22, provides a flow path through which the filtered air may flow, towards the back end of the housing, where it enters through the orifice(s) 12 into the air space and circuitous air path C, as previously explained. Essentially, once the air reaches the bottom portion of the housing, it passes through the various staggered baffles, as provided at 23, until it reaches the area between the front of the housing 15, and the front plate 13 of the filter support, attaining access into this location by passing through the port 24 furnished through the lower front wall 14 of the support 9.

Thus, as has been determined, by providing a circuitous path through which the air passes, as around and through the baffles 23, it has a tendency to significantly dampen the noise of the air attracting operations of the compressor, operatively associated with the concentrator, thereby making it far less irritating, soundwise, to the patient, reducing any impairment to hearing, providing the only apparent sound emanating from the oxygen concentrator to that of the suction of air, and minimizing the mechanical compression sounds of the compressor, during usage and operation of the concentrator, in supplying purified oxygen to the patient.

Figure 12:
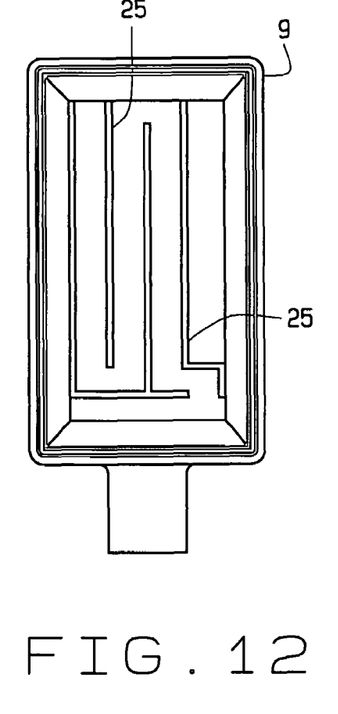
FIG. 12 is a top view of the containment housing showing a differing air flow baffling arrangement.
Figure 13:
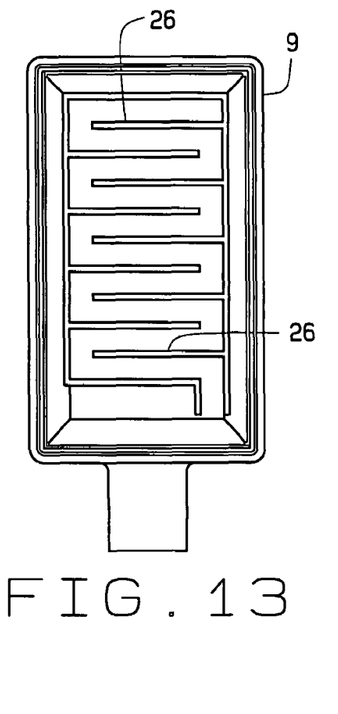
FIG. 13 is a top view of the interior of the containment housing showing a differing arrangement for the air flow baffling arrangement.
Figure 14:
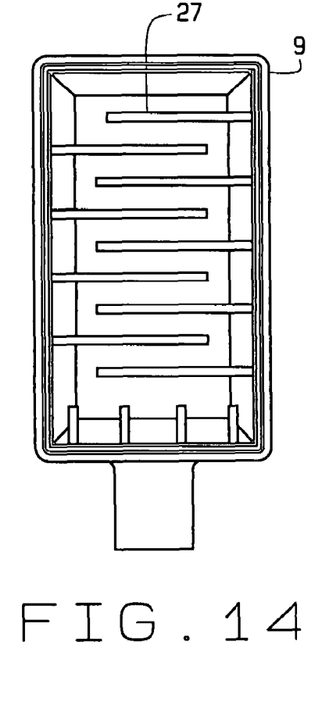
FIG. 14 is a top interior view of the containment housing showing a further differing air flow baffling arrangement for the housing.

FIGS. 11-14 show variations on the style of baffling arrangements that may be integrated and molded into the bottom of the containment housing 9 of this invention. For example, in FIG. 11 it can be seen that the baffling, as at 24, may present a maze for passage of the air thereth rough, generally along a longitudinal path for airflow. FIG. 12 shows how the baffling 25 may likewise provide longitudinal air flow through the various baffling as the air has been filtered and is directed and absorbed towards the concentrator. FIG. 13 discloses a variety of horizontally arranged baffles, at 26, for a transfer of the air for sound dampening, during usage. Finally, FIG. 14 discloses horizontally arranged baffling, as at 27, similar to the pattern for the baffles as previously described with respect to the embodiment shown in FIG. 5. These are examples of how baffling may be arranged, for providing a plurality of three hundred and sixty degrees (360°) turns for the air, flowing therethrough, and which, as has been discovered, significantly dampens the sound of the mechanical means used to attract the air into the concentrator, during usage. While the preferred embodiment describes this baffling as being integrally molded in the bottom of the containment housing, it is just as likely that such baffling could also be formed upon the bottom of the filter support base 10, and extend downwardly, to furnish the type of baffling as shown herein, and which effectively forms the circuitous path for flow of the filtered air towards the concentrator.

Variations or modifications to the subject matter of this invention may occur to those skilled in the art upon review of the description of the preferred embodiment as provided herein. Such variations, if within the spirit of this development, are intended to be encompassed with the scope of any invention as described. The specific description of the preferred embodiment, as shown in the drawings, is set forth for illustrative purposes only.

The invention claimed is:

1. An air filtering assembly formed as a molded casement and for use with oxygen concentrating equipment and for application in filtering air and providing for compressor noise reduction as the filtered air is drawn to the equipment compressor, said assembly including a containment housing, said containment housing having side, front and back end walls, and a bottom wall, all integrally formed together, a fitting connecting with the front end wall and providing a discharge port for passage of filtered air, a cover, said cover provided for tight fitting onto the top of the containment housing, said cover having an intake port therethrough, for passage of air into the assembly, a filter support and divider removably provided within the housing, the filter support provided for support of a filter therein, and said filter compactly filling the volumetric space between the side, front and back walls of the housing to effectively filter the air passing therethrough, and the divider of the filter support having ribs to furnish support for the filters spacedly from the divider to allow the filtered air to flow the length of the divider for entrance towards the bottom wall of the housing during continuing flow through the said containment housing, an aperture provided through the divider to allow the filtered air to pass into the bottom of the housing, the space between the bottom of the housing and the divider providing a series of baffles furnishing a circuitous path for flow of the filtered air therethrough, said series of baffles provided between the space at the bottom of the housing and the divider are staggered, with the even number dividers extending from one wall of the housing but ending short of the opposite wall of said housing, while the odd number baffles extend from the opposite wall of the housing to just short of the first wall of said housing to thereby provide a circuitous path for flow of the filtered air therethrough, said baffles being integrally formed internally of the bottom of the containment housing and therein providing for damping of the noise generated through the operations of the air filter and concentrator as the filtered air passes through the fitting and to the concentrator for oxygen generation, said cover being removable from the containment housing, and said cover, when applied to the housing providing clearance between the interior of the cover and the filter contained therein to allow air to move entirely around the internal region of the cover and over the entire filter to provide for filtration of the passing air through the approximate entire filter, and the intake port of the cover provided through the cover within the confines of its edges, said aperture provided through the divider being located at an opposite location of the containment housing from the location of the discharge port provided through the front end wall of said housing, said divider having a front wall, part of said front wall extending above the divider, and part of said front wall extending below the divider, that portion of the front wall extending below the divider having an opening therethrough for passage of the filtered air through to the discharged port.

2. The air filtering assembly of claim 1 wherein the cover is reinforced.

3. The air filtering assembly of claim 2 wherein the cover reinforcement includes a series of integral ribs.

4. The air filtering assembly of claim 1 wherein the front wall of the divider having a forwardly extending ledge, said ledge cooperating with the front wall of the housing to provide for a sealing of the air passing between the front wall of the divider and the front of the housing that prevents any contamination with the unfiltered air incoming into the air filtering assembly through the cover intake port.

* * * * *